United States Patent
Aust et al.

[11] 3,900,861
[45] Aug. 19, 1975

[54] CAMERA FOR MICROPHOTOGRAPHY

[75] Inventors: Gert-Rudiger Aust; Siegfried Hainy; Erich Korf, all of Dresden, Germany

[73] Assignee: VEB Pentacon, Dresden, Germany

[22] Filed: Oct. 9, 1973

[21] Appl. No.: 404,253

[30] Foreign Application Priority Data
Nov. 8, 1972 Germany............................ 316680
Jan. 13, 1973 Germany............................ 2301731
June 29, 1973 United Kingdom............... 15270/73

[52] U.S. Cl. ............................................. 354/209
[51] Int. Cl. ........................................... G03b 19/02
[58] Field of Search................................... 354/209

[56] References Cited
UNITED STATES PATENTS
3,563,648  2/1971  Baggaley............................. 355/53
3,678,834  7/1972  Melillo.................................. 95/36

*Primary Examiner*—John M. Horan
*Attorney, Agent, or Firm*—William Anthony Drucker

[57] ABSTRACT

A microfilm camera is adapted for partial or overall exposure of a film format according to choice. The camera is provided with film transport mechanism comprising sprockets driven by a film transport motor which may be actuated by a transport switch operable by the camera shutter. A change-over switch can be moved between "overall exposure" and "partial exposure positions", said change-over switch being connected in series with the transport switch whereby the film transport mechanism operates to shift the film by one frame when the changeover switch is in its "overall exposure" position. When the change-over switch is in the "partial exposure" position no shifting of the film takes place when the transport switch is closed.

3 Claims, 9 Drawing Figures

CAMERA FOR MICROPHOTOGRAPHY

BACKGROND TO THE INVENTION

The invention relates to a device in microfilm cameras for the partial exposure of originals of large format, e.g. diagrams, having an intermittently movable film transport mechanism the transport motor whereof can be made to work after the process of exposure by a transport switch actuable by the shutter of the camera.

In known microfilm cameras the film is advanced by one frame after every exposure process. But cameras for microphotography provide the advantage that several originals of small format can be photographed instead of one original of large format. When originals printed on both sides are involved it may be desired, for example, to first photograph the odd pages 1, 3, 5 and 7 and thereafter the even pages 2, 4, 6 and 8. With periodicals it is desirable to successively photograph for example the adjoining pages 1 and 2, 3 and 4, 5 and 6. There thus arises the need to be able to consecutively partially expose a single film frame.

The object of the invention is the occasional partial exposure of a film frame and its problem is the creation of a device suitable therefor.

SUMMARY OF INVENTION

According to the invention there is provided in a microfilm camera having a housing enclosing a camera shutter and an intermittently movable film transport mechanism including a transport motor, and a switch device operable by said shutter, the provision of a change-over switch connected in series with the film transport switch and movable between one position for "overall exposure" and another position for "partial exposure" of the film format, the circuit through the transport motor being completed to transport the film with the change-over switch in the "overall exposure" position when the transport switch is actuated by the shutter whilst the circuit though the transport motor is open with the change-over switch in the "partial exposure" position and wherein there is provided in said camera housing a counter mechanism, comprising a step-wise movable counting member, means for moving said counting member by one step upon each successive operation of the shutter with said change-over switch in the "partial exposure" position and a trip cam on said counting member for actuating said change-over switch into the "overall exposure" position upon the last desired operation of the shutter with said change-over switch in the "partial exposure" position, said means for moving said counting member being operated electromagnetically and connected in series with said transport switch by way of said change-over switch.

BRIEF DESCRIPTION OF DRAWINGS

The invention is explained in greater detail by way of example with reference to the accompanying drawings.

DESCRIPTION OF PREFERRED EMBODIMENT

Figure 1:
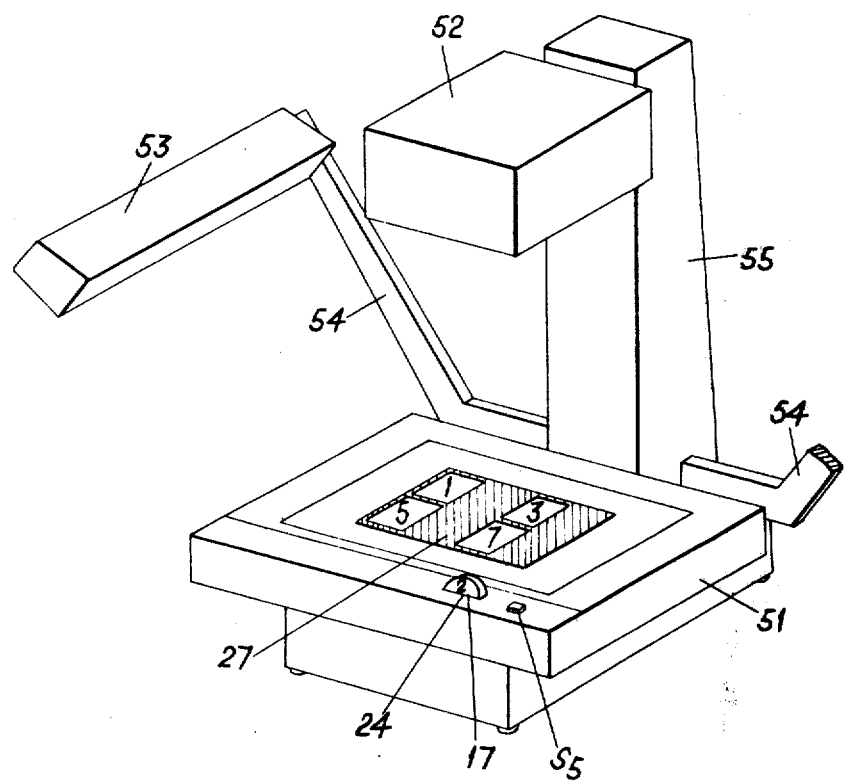
FIG. 1 shows a perspective view of the microfilm apparatus according to the present invention.
Figure 5:
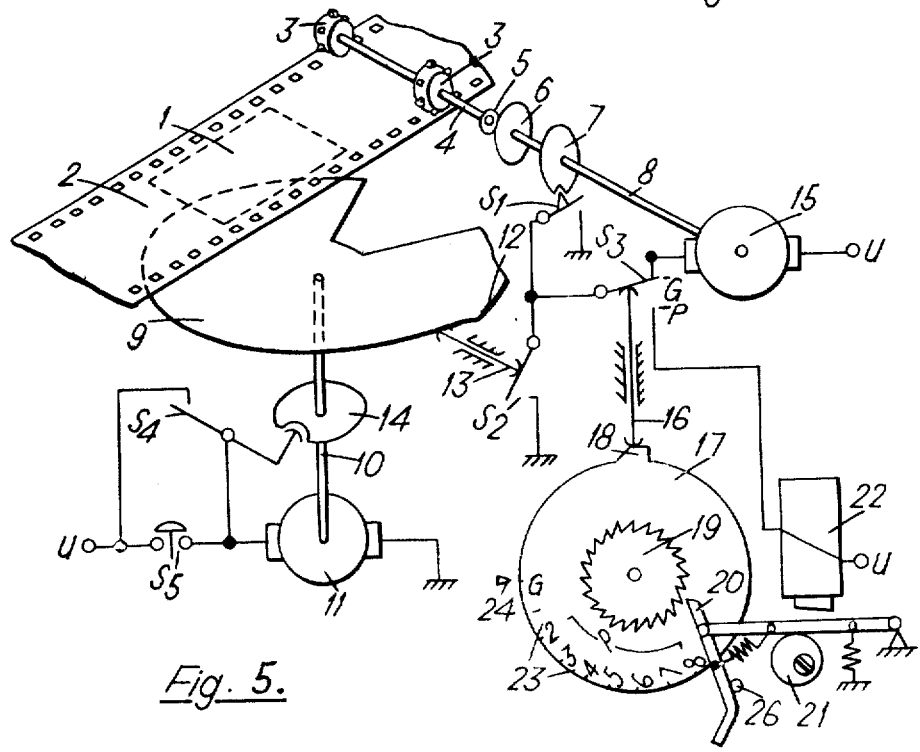
FIG. 5 shows the schematic arrangement of a camera adapted to be switched by means of a set-back counter mechanism, set to overall exposure.
Figure 6:
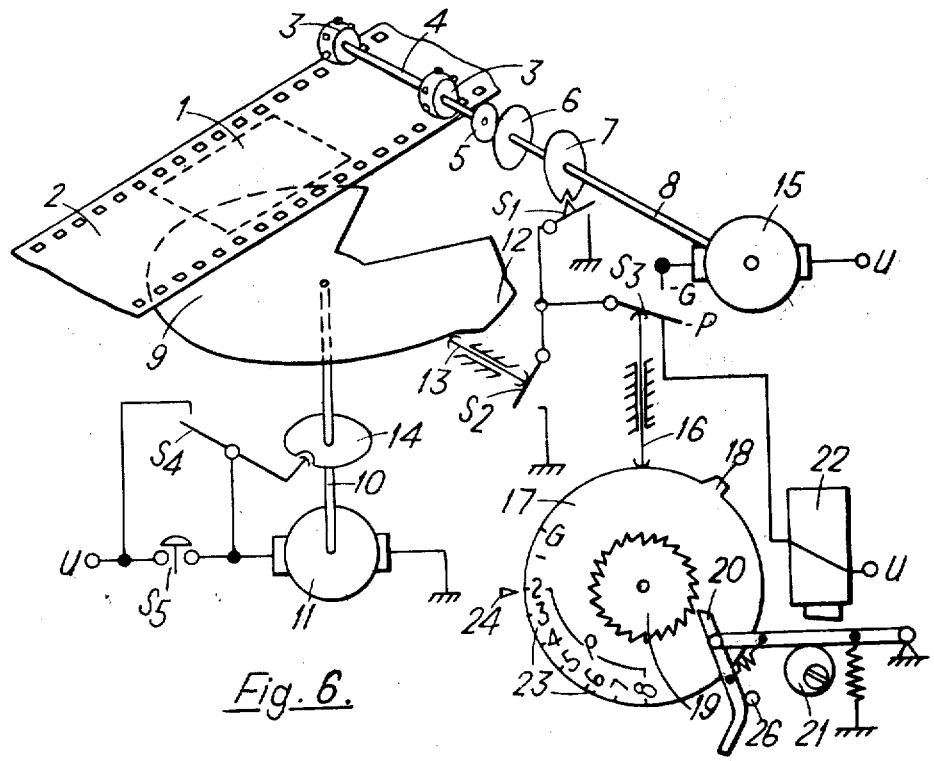
FIG. 6 shows the schematic arrangement of FIG. 5, set to partial exposure.

The film 2 adapted to be conveyed by transport rolls 3 is disposed behind the image window 1 (cf. FIG. 5) in a housing 52, of a microfilm camera mounted on a column 55 (see FIG. 1). The original copies are illuminated by lamps 53, which are affixed to arms 54. The small cogwheel 5 meshing with the large cogwheel 6 is seated on the transport shaft 4. The indexing gear 7 which is adapted to actuate the switch $S_1$ is rigidly connected with the motor shaft 8.

The shutter disc 9 is rotatably arranged in front of the image window 1. The shutter shaft 10 is driven by the electric motor 11. The trip cam 12 adapted to actuate the switch $S_2$ via the plunger 13 is provided on the shutter disc 9. The parallel connected switches $S_1$ and $S_2$ are connected in series with the change over switch $S_3$ in the circuit of the transport motor 15. The change-over switch $S_3$ can be selectively moved to the contact G (overall exposure) or to the contact P (partial exposure). The transport motor 15 is connected to the contact G while the electromagnet 22 is connected to the contact P.

Via the plunger 16 the change-over switch $S_3$ can be actuated between the positions G and P by the indexing wheel 17 provided with the trip cam 18. The indexing wheel 17 is rigidly connected with the gear wheel 19. The gear wheel 19 cooperates with the pawl 20 the normal position whereof is adjustable by means of the eccentric 21. The pawl 20 is actuatable by the electromagnet 22. In the normal position the switching pawl 20 is held disengaged from the gear wheel 19 by the pin 26.

The indexing wheel 14 adapted to actuage the switch $S_4$ is connected with the shutter shaft 10. The switch $S_4$ is connected parallel with the trigger switch $S_5$ in the circuit of the shutter motor 11.

Figure 7:
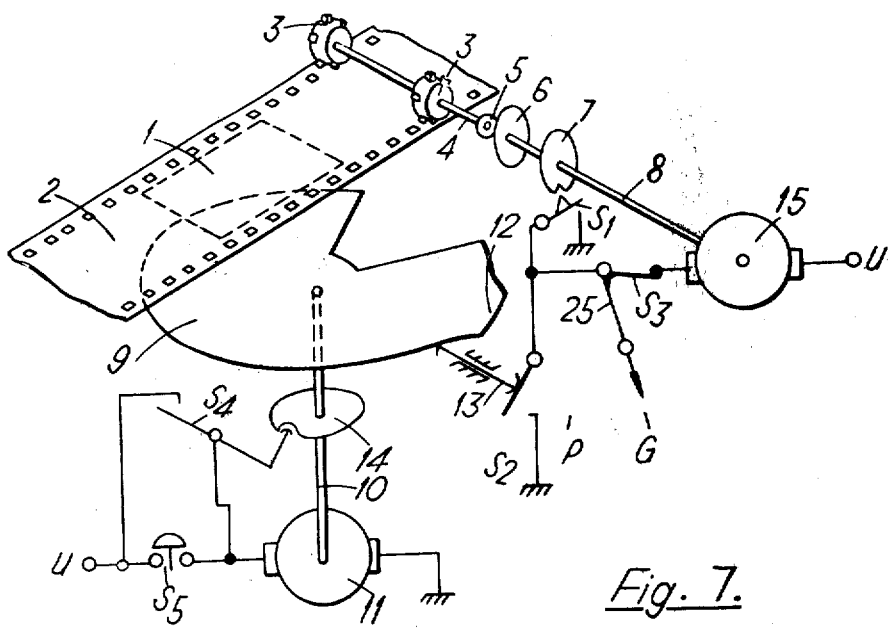
FIG. 7 shows the schematic arrangement of a camera switched manually to partial exposure.

The mode of operation is as follows:

In order to make a partial exposure of the film section 2 defined by the window 1 the indexing wheel 17 has been set relative to the index 24 by means of the dial 23 (cf.FIG. 7). In accordance with the example illustrated two partial exposures are to be shot. In this position the change-over switch $S_3$ engages the contact P so that the circuit of the transport motor 15 is interrupted.

Figure 3:
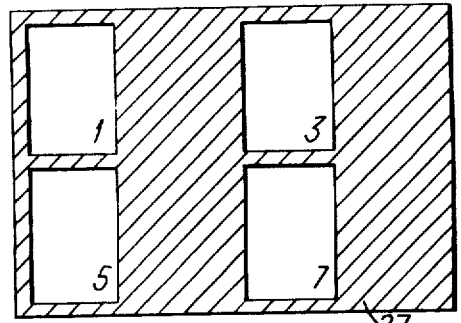
FIG. 3 shows the first partial exposure of a section of film.
Figure 4:
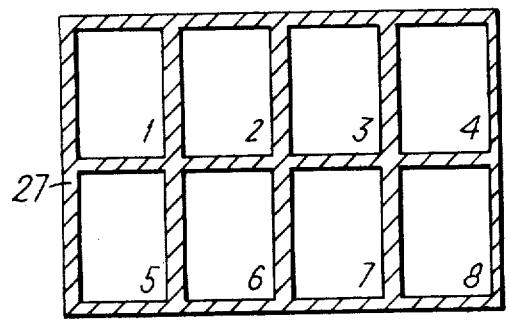
FIG. 4 shows the further partial exposure of the film section of FIG. 3.

The camera table 51 for the original having been covered with a black base support 27 the orginals are placed on this support in the desired order (cf.FIG. 3). Since originals printed on both sides are to be photographed the odd pages 1, 3, 5 and 7 are first placed face up on the support.

Figure 8:
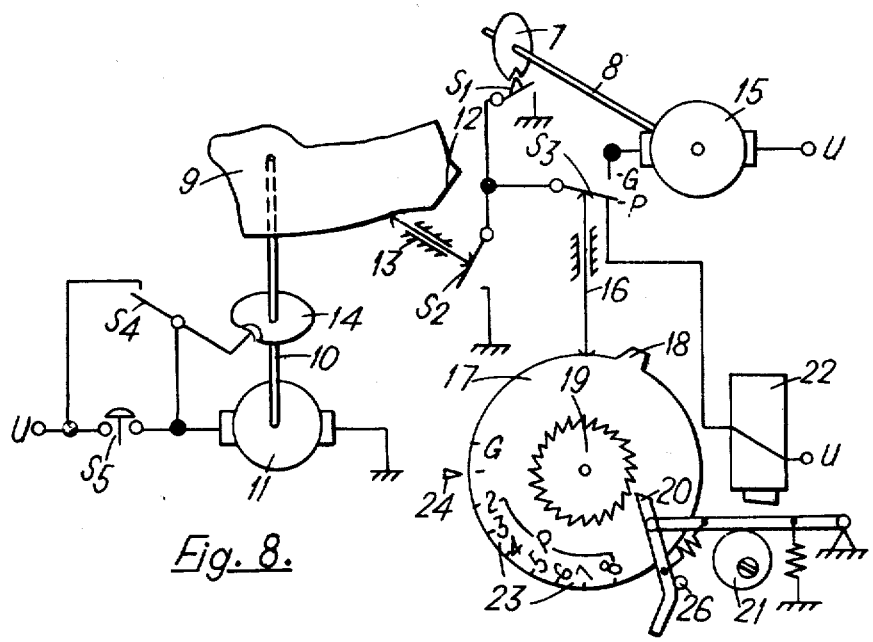
FIGS. 8 and 9 show further operating positions of the embodiment of FIG. 6.

The first exposure process is initiated by briefly closing the release switch $S_5$. The shutter motor rotates the indexing wheel 14 and the shutter disc 9 counterclockwise. The switch $S_4$ is briefly closed by the indexing wheel 14 so that the shutter motor remains energised despite the trigger switch $S_5$ returning to its open position. Towards the end of one revolution of the shutter disc 9 the trip cam 12 arrives at the plunger 13 so that the switch $S_2$ is closed. The electromagnet 22 is thereby energised and the gear wheel 19 and the indexing wheel 17 are moved back counter-clockwise by one step, via the switching pawl 20 (cf.FIG. 8).

Figure 9:
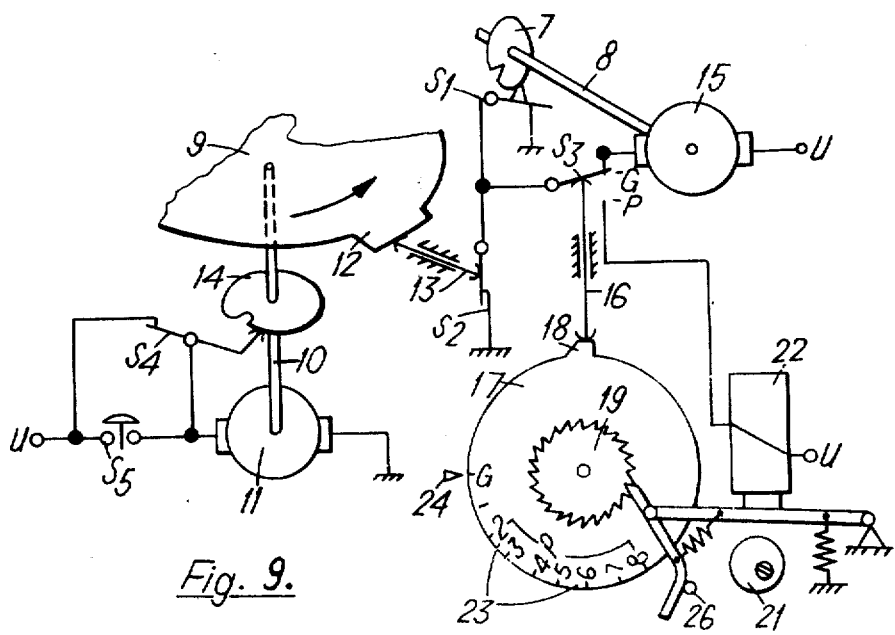

In order to make the second partial exposure the originals are turned over so that their even pages 2, 4, 6 and 8 are now face up on the black base support of the table in new positions offset from their initial positions. The shutter motor is again started by closing the trigger switch $S_5$. As soon as the trip cam 12 of the shutter disc 9 closes the switch $S_2$ the electromagnet 22 is again energised. Consequently the indexing wheel 17 is moved a further step counter-clockwise, so that the indicia G faces the index 24 and the trip cam 18 actuates the change-over switch $S_3$ via the plunger 16. The change-over switch $S_3$ is lifted off the contact P and applied to the contact G so that the transport motor 15 is started (cf. FIG. 9). The switch $S_1$ actuated by the indexing wheel 7 holds the circuit of the motor closed until the film 2 has been advanced by a step corresponding to the length of the window 1. Thereafter the camera is again in the position (cf.FIG. 5) corresponding to the setting to indicia G (overall exposure).

Figure 2:
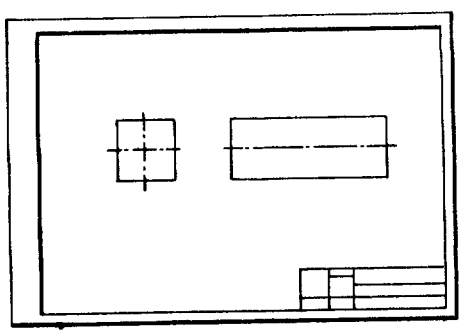
FIG. 2 shows the overall exposure of a section of film.

In order to make an overall exposure, for example so as to be able to photograph a drawing of large format (cf.FIG. 2), the indexing wheel 17 remains in the position in which the indicia G faces the index 24. When the trigger $S_5$ is actuated an exposure process is initiated and immediately followed by transporting of the film.

According to a further exemplary embodiment (cf.FIG. 7) the change-over switch $S_3$ can be actuated by means of the manual lever 25 for the purpose of switching from overall exposure to partial exposure, and can be set to face the indicia G (overall exposure) and P (partial exposure). In the position G the change-over switch $S_3$ is closed while in the position P the change-over switch $S_3$ is open.

We claim:

1. In a microfilm camera having a housing enclosing a camera shutter and an intermittently movable film transport mechanism including a transport motor, and a switch device operable by said shutter, the provision of a change-over switch connected in series with the film transport switch and movable between one position for "overall exposure" and another position for "partial exposure" of the film format, the circuit through the transport motor being completed to transport the film with the change-over switch in the "overall exposure" postion when the transport switch is actuated by the shutter whilst the circuit though the transport motor is open with the change-over switch in the "partial exposure" position and wherein there is provided in said camera housing a counter mechanism, comprising a step-wise movable counting member, means for moving said counting member by one step upon each succesive operation of the shutter with said change-over switch in the "partial exposure" postion and a trip cam on said counting member for actuating said change-over switch into the "overall exposure" position upon the last desired operation of the shutter with said change-over switch in the "partial exposure" position, said means for moving said counting member being operated electromagnetically and connected in series with said transport switch by way of said change-over switch.

2. In a microfilm camera according to claim 1, wherein there is provided in said camera housing a counter mechanism, comprising a step-wise movable counting member, means for moving said counting member by one step upon each successive operation of the shutter with said change-over switch in the "partial exposure" position and a trip cam on said counting member for actuating said change-over switch into the "overall exposure" position upon the last desired operation of the shutter with said change-over switch in the "partial exposure" position, said means for moving said counting member being operated electromagnetically and connected in series with said transport switch by way of said change-over switch.

3. In a microfilm camera according to claim 2, wherein said stepwise movable counting member comprises a dial having numerals thereon and said counting mechanism further includes a fixed mark against which a numeral on said dial, indicative of the desired number of partial exposures, may be set.

* * * * *